United States Patent
Moraal et al.

(10) Patent No.: US 6,574,956 B1
(45) Date of Patent: Jun. 10, 2003

(54) APPARATUS AND METHOD FOR INTERRUPTING REGENERATION OF A PARTICULATE FILTER IN A DIESEL ENGINE

(75) Inventors: Paul Eduard Moraal, Vaals (NL); Urs Christen, Aachen (DE); Yasser Mohamed Sayed Yacoub, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/053,042

(22) Filed: Jan. 23, 2002

(30) Foreign Application Priority Data

Nov. 8, 2000 (EP) .............................. 00123961

(51) Int. Cl.$^7$ ................................................ F01N 3/00
(52) U.S. Cl. ....................... 60/295; 60/274; 60/278; 60/297; 123/568.18; 123/568.19; 123/568.31; 701/108
(58) Field of Search .................. 60/274, 278, 285, 60/287, 295, 297, 311, 280; 701/108, 115; 123/568.11, 568.18, 568.19, 568.31

(56) References Cited

U.S. PATENT DOCUMENTS

| 4,211,075 A | | 7/1980 | Ludecke et al. |
| 4,719,751 A | * | 1/1988 | Kume et al. .................. 60/285 |
| 4,747,264 A | | 5/1988 | Santiago et al. |
| 4,835,964 A | | 6/1989 | Kume et al. |
| 5,042,248 A | | 8/1991 | Abthoff et al. |
| 5,601,068 A | | 2/1997 | Nozaki |
| 6,032,656 A | * | 3/2000 | Itoyama et al. ......... 123/568.21 |
| 6,253,543 B1 | * | 7/2001 | Russell ......................... 60/274 |
| 6,304,815 B1 | * | 10/2001 | Moraal et al. ............... 701/115 |
| 6,438,948 B2 | * | 8/2002 | Ono et al. ..................... 60/311 |

FOREIGN PATENT DOCUMENTS

| DE | 4234841 | 4/1993 |
| FR | 2774424 | 8/1999 |
| JP | 60090931 | 5/1985 |
| JP | 1087820 | 3/1989 |
| JP | 5133285 | 5/1993 |
| JP | 0828847 | 2/1995 |

* cited by examiner

Primary Examiner—Thomas Denion
Assistant Examiner—Binh Tran
(74) Attorney, Agent, or Firm—Diana D. Brehob

(57) ABSTRACT

The invention relates to a method for interrupting the regeneration of a particulate filter in the exhaust gas system of a diesel engine to protect the filter against destructive overheating. In this case, an electronic control unit calculates a desired mass air mass flow rate ($MAF_{des}$) based on engine speed (n), fuel supply ($F_q$) to the engine, and air/fuel ratio ($A/F_{des}$). A mass air flow rate regulator controls the position of an exhaust gas recirculation (EGR) valve as a function of the difference between the desired mass air mass flow rate ($MAF_{des}$) and the measured mass air flow rate ($MAF_{mes}$). An intake manifold absolute pressure controller adjusts the position of an intake throttle valve as a function of the difference between the measured intake manifold absolute pressure ($MAP_{mes}$) and the modified intake manifold absolute pressure ($MAP_{mod}$). $MAP_{mod}$ is determined by a coordination module, based on the mass air flow rate error and other parameters.

22 Claims, 3 Drawing Sheets

APPARATUS AND METHOD FOR INTERRUPTING REGENERATION OF A PARTICULATE FILTER IN A DIESEL ENGINE

FIELD OF THE INVENTION

The invention relates to a method for interrupting the regeneration of a particulate filter in the exhaust gas system of a diesel engine, with the mass air flow rate (MAF) and the intake manifold absolute pressure (MAP) being detected by sensors. More particularly, the invention relates to closed-loop control for interrupting the regeneration of a diesel particulate filter (DPF), when the temperature in the DPF is too high, by controlling an intake throttle valve and an exhaust gas recirculation (EGR) valve.

BACKGROUND OF THE INVENTION

Soot particles are removed from the exhaust gas flow from a diesel engine by arranging one or more diesel particulate filters (DPF) in the engine's exhaust system. Since particulate matter accumulates during operation, particulate matter is removed from the filter when the filter load exceeds a predetermined threshold. A regeneration or oxidation process, which is carried out onboard the vehicle, is the preferred approach for this purpose in automobiles. Regeneration of the DPF is carried out by increasing exhaust gas temperature to allow combustion of accumulated particulate matter in the presence of adequate oxygen.

During regeneration, DPF temperature must be kept below a critical threshold to prevent thermal damage to the DPF. If the threshold is exceeded, measures can be taken to interrupt regeneration as quickly as possible. An uncontrolled combustion rate in a DPF can cause it to melt. Such a situation can occur, for example, by the air supply being excessively restricted for a relatively long period followed by unrestricted operation. In this situation, the rise in the oxygen supply initiates an excessive combustion rate in the overheated DPF.

Patent Abstract JP 60090931 describes using an intake throttle valve to limit the supply of fresh air if a filter temperature above a predetermined limit is detected.

According to Patent Abstract JP 01087820, an oxygen sensor is provided, which is arranged on the inlet side of the DPF and is intended to control the combustion rate of the particulate matter, and hence the temperature rise in the filter, by restricting intake air flow by adjusting the intake throttle valve.

According to Patent Abstracts JP 05133285 and JP 05106518, an intake throttle valve and an EGR valve are used to control DPF regeneration. During regeneration, EGR is reduced in relation to time without regeneration. If deceleration occurs during the regeneration process, the EGR valve is completely opened, while the fresh air is restricted. This further reduces the oxygen content in the exhaust gas flow.

SUMMARY OF THE INVENTION

The inventors of the present invention have recognized a twofold method for interrupting regeneration. First, measures that have been taken to increase the exhaust gas temperature in the inlet to the DPF are discontinued. Secondly, the oxygen concentration in the exhaust gas flow to the DPF is reduced as suddenly as possible. The amount by which the oxygen concentration is limited is governed by the stability of the combustion process in the engine, so that correct engine operation is maintained.

The first type of measures include: switching off auxiliary loads, (such as electrical loads, eg., glow plugs or increased idle speed), measures which reduce combustion efficiency (eg., retarding injection timing, lowering pressure of injection), measures to transfer heat into the intake stream, the exhaust stream, or both (eg., external heaters, post injection of fuel late in the expansion stroke, injection of fuel into the exhaust stream using an additional injector located in the exhaust duct), measures to stimulate an exotherm in an oxidation catalyst placed in front of the DPF (eg., increasing amount of unburned fuel in the exhaust stream).

The second measure can be achieved by actuating the intake throttle valve and the EGR valve. During forced regeneration of the DPF: the EGR valve is typically fully closed to maximize oxygen concentration in the exhaust gas; and the intake throttle valve would be closed to increase pumping load on the engine and to reduce flow rate through the engine, which increases engine out temperature. The inventors of the present invention have recognized that it is preferable to coordinate the positions of the EGR and intake throttle valves during forced regeneration so that a desired oxygen concentration at the inlet to the DPF exists. To halt the regeneration process, the air-fuel ratio is reduced as much as possible without causing engine stability to degrade beyond an acceptable level. Preferably, this is accomplished by opening the EGR valve to a maximum position and closing the intake throttle as little as necessary to achieve maximum flow rate of the products of stoichiometric combustion through the DPF. This control action is carefully coordinated to avoid flushing the highly heated filter material with an oxygen-rich exhaust.

Disadvantages of prior approaches are overcome by a method for interrupting regeneration of a particulate filter in the exhaust gas system of an internal combustion engine with the air mass flow to the engine and the intake manifold absolute pressure being detected by sensors and being varied by operating an intake throttle valve disposed in an intake duct of the engine and an EGR valve disposed in an EGR duct connected to an exhaust duct of the engine and an intake inlet duct downstream of the intake throttle valve. The method includes the steps of actuating the EGR valve to maintain a predetermined air mass flow rate and actuating the intake throttle valve to maintain a predetermined intake manifold absolute pressure. The predetermined intake manifold absolute pressure is based on a pressure correction and a desired intake manifold absolute pressure. The pressure correction depends on a difference between the predetermined mass air flow rate and a measured mass air flow rate.

DPF regeneration is generally interrupted to prevent the DPF from being destroyed by excessively high temperatures. For this reason, the method according to the invention is preferably initiated when a predetermined temperature threshold is exceeded in the DPF. However, other criteria are also feasible, in which the method can be started on other, sensible bases.

The inventors of the present invention have recognized that the variables involved in interrupting regeneration in a DPF interactively depend on each other. An advantage of the present invention is that by coordinating control of the variables, interruption of regeneration of the DPF is improved. An important aspect of the present invention is to limit the oxygen concentration of the exhaust gases at the inlet of the DPF.

The above advantages, other advantages, and features of the present invention will be readily apparent from the following detailed description of the preferred embodiments when taken in connection with the accompanying drawings.

BRIEF DESCRIPTION OF THE DRAWINGS

The advantages described herein will be more fully understood by reading an example of an embodiment in which the invention is used to advantage, referred to herein as the Detailed Description, with reference to the drawings wherein.

DETAILED DESCRIPTION OF PREFERRED EMBODIMENTS

Figure 1:
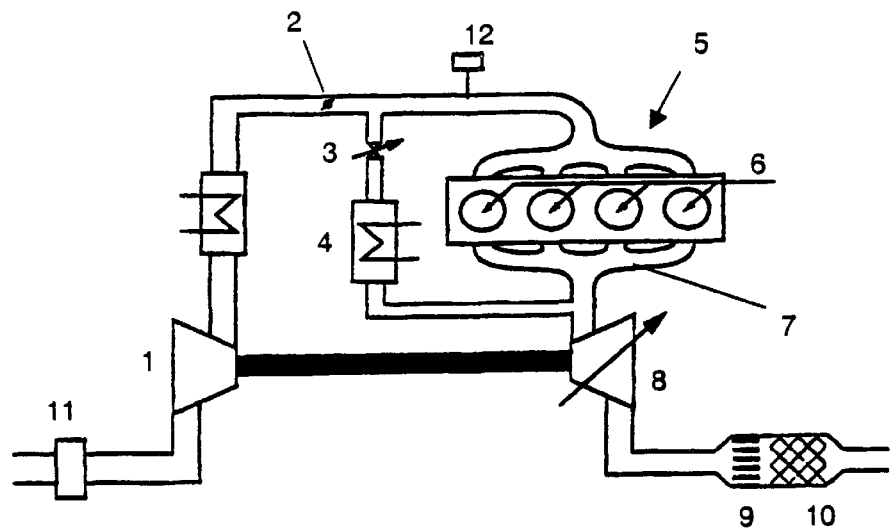
FIG. 1 is a schematic drawing of the a diesel engine showing elements significant to the present invention.

FIG. 1 shows, schematically, those components of a diesel engine significant to the present invention. Air is inducted and compressed by a compressor 1, and is supplied to diesel engine 5 through its intake manifold. An intake throttle valve 2 is in the air duct between compressor 1 and diesel engine 5. Fuel is injected into the cylinders of diesel engine 5 via fuel injectors 6, and is burned with air. Exhaust gases produced in the cylinders leave diesel engine 5 via exhaust manifold 7. A portion of these exhaust gases is supplied by an EGR system to the inlet side of diesel engine 5. Exhaust gases pass through an EGR cooler 4 and an EGR valve 3. EGR quantity is controlled by EGR valve 3. That portion of the exhaust gases which is not recirculated to the intake manifold flows into a turbine 8, possibly a variable geometry turbine type, which rotates by expansion of exhaust gases flowing through it. Turbine 8 is coupled to and provides the driving force for compressor 1. Exhaust gases then flow into an exhaust gas aftertreatment system comprising an oxidation catalytic converter 9 and a DPF 10 located downstream of turbine 8.

An air mass flow sensor 11 is arranged upstream of compressor 1 in the air intake. An intake manifold absolute pressure 12 is located in the intake manifold of diesel engine 5.

To remove particulate matter from DPF 10, it is known to increase exhaust gas temperature above the ignition temperature of the particulate matter. There are at least three measures for increasing exhaust gas temperature: reducing the gas flow through the engine so that the energy released during combustion is distributed over less mass; reducing engine efficiency, so that more energy is consumed for the same mechanical power and more thermal energy is rejected into the exhaust gases; and providing unburned hydrocarbons to catalytic converter 9 to react within exothermically.

According to an aspect of the invention the regeneration of DPF 10 is interrupted when necessary to protect DPF 10 against overheating. This is based on signals from sensors 11 and 12 which measure the mass air flow rate and intake manifold absolute pressure, respectively. Furthermore, a signal detecting the position of EGR valve 3 may also be used. The actuators influenced in the course of the method include the intake throttle valve 2 and the exhaust gas recirculation valve 3.

Figure 2:
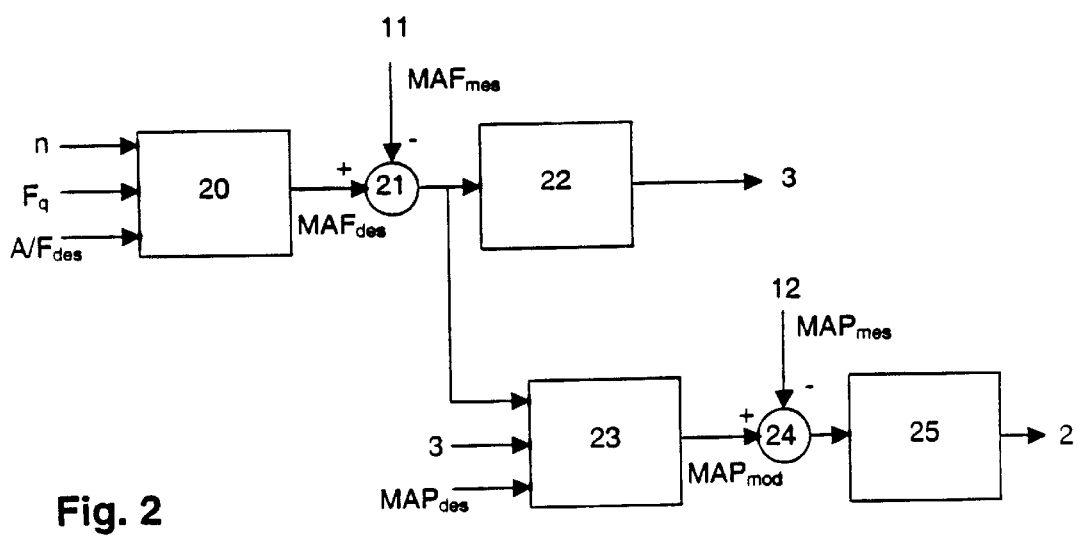
FIG. 2 is a block diagram of coordinated control of the air mass flow and inlet pressure, according to an aspect of the present invention.

FIG. 2 shows, schematically, the closed-loop control arrangement according to an aspect of the present invention. The desired mass air flow rate, $MAF_{des}$, is computed in module 20 based on desired air/fuel ratio $A/F_{des}$, injected amount of fuel $F_q$, and engine speed, n. Preferably, under transient operation, information about EGR flow rate is used also in the computation of $MAF_{des}$, to account for the oxygen content in the recirculated gas. The mass air flow rate controller 22 responds to the error between the desired mass air flow rate, $MAF_{des}$, and measured mass air flow rate, $MAF_{mes}$, signals, as shown in adder 21. The output of 22 is a signal which is used to control EGR valve 3. Preferably, the control algorithm implements an integral controller in 22 with anti-windup. To allow for fast response, a feed forward term and a non-linear integral gain, as a function of error in mass air flow rate, are used. Coordinator module 23 coordinates the actions of the mass air flow rate module 21 and the manifold absolute pressure controller 25 and is discussed in detail below.

The manifold absolute pressure regulator 25 reacts to the difference between a modified intake manifold absolute pressure setpoint, $MAP_{mod}$, and the measured intake manifold absolute pressure, $MAP_{mes}$, by controlling the signal acting on the intake throttle valve 2. The difference is calculated in the adder 24 and is then supplied to regulator 25. The control algorithm used in regulator 25 preferably uses nonlinear integral control.

The output of 23 is $MAP_{mod}$. This is achieved by adding an offset to the initial $MAP_{mes}$. The offset is the output of an integrator block, the input of which is driven by two terms, as will be discussed in more detail in regards to FIG. 3.

Figure 3:
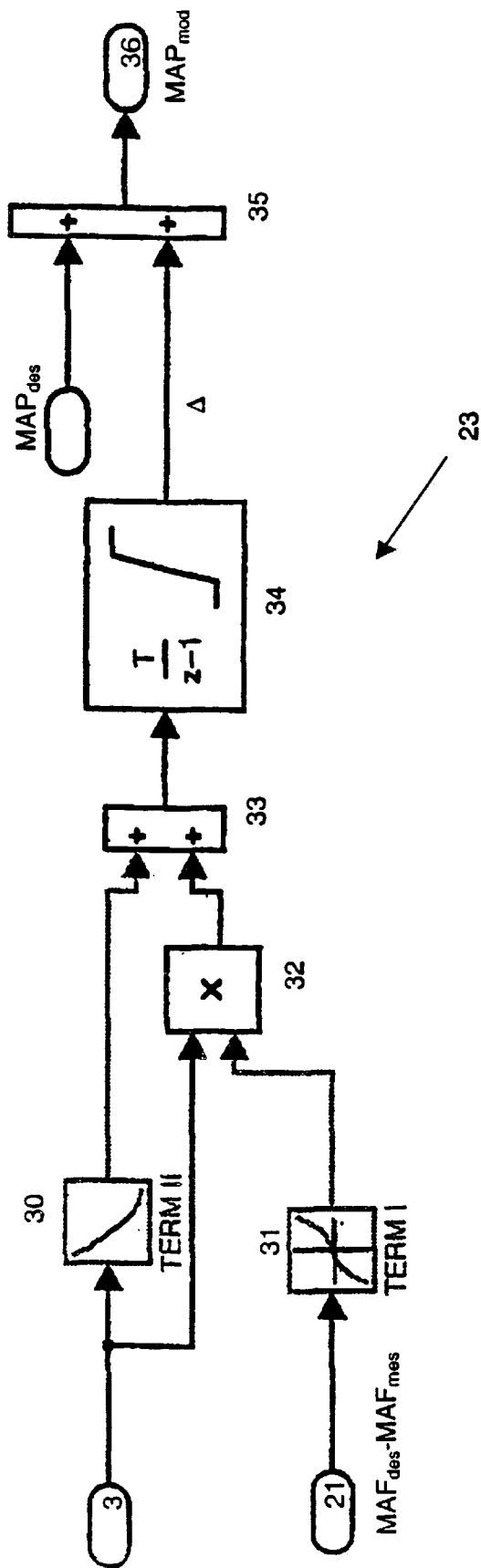
FIG. 3 is a block diagram of a coordination module to carry out the coordinated control shown in FIG. 2, according to an aspect of the present invention.

The coordination module 23 is shown in more detail in FIG. 3. $MAP_{mod}$ of block 36 is based on a sum formed in block 35. The first summand is $MAP_{des}$, which is calculated in a manner known by those skilled in the art. The second summand in block 35 consists of a pressure correction, Δ, which is formed by the output value from an integration block 34. Time-discrete integration is preferably carried out in block 34.

The signal integrated in block 34 is based on a sum, formed in block 33, of a nonlinear function 31 of the air mass flow error ($MAF_{des}$—$MAF_{mes}$) and a monotonically decreasing function 30 of the position of EGR valve 3, which is equal to zero in the completely open position.

The output value from function 31 is multiplied in block 32 by the position of EGR valve 3. For this purpose, the position is represented by a value between 0 and 1, with 0 corresponding to the valve being completely closed, and 1 corresponding to the valve being completely open. The first summand in the block 33 reduces the value of $MAP_{mod}$ (i.e., greater EGR flow) if the mass air flow rate error is negative (measured value is greater than the desired value), and vice versa. The magnitude of this term is proportional to the position of the EGR valve, to cause intake flow to be restricted (reduced induction pressure value) when EGR valve 3 is completely open and the mass air flow rate error is still negative. This induces an increased EGR flow.

The function 30 is a monotonically decreasing function of the position of the EGR valve 3, which is equal to zero when completely open. By way of example, this summand may be a square function of the position of the EGR valve 3. Function 30 drives EGR valve 3 continuously in the opening direction when the completely open position has not yet been reached. This is achieved indirectly by increasing $MAP_{mod}$, resulting in the intake throttle valve 2 being opened further and the EGR valve 3 being opened further to achieve $MAF_{des}$.

Figure 4:
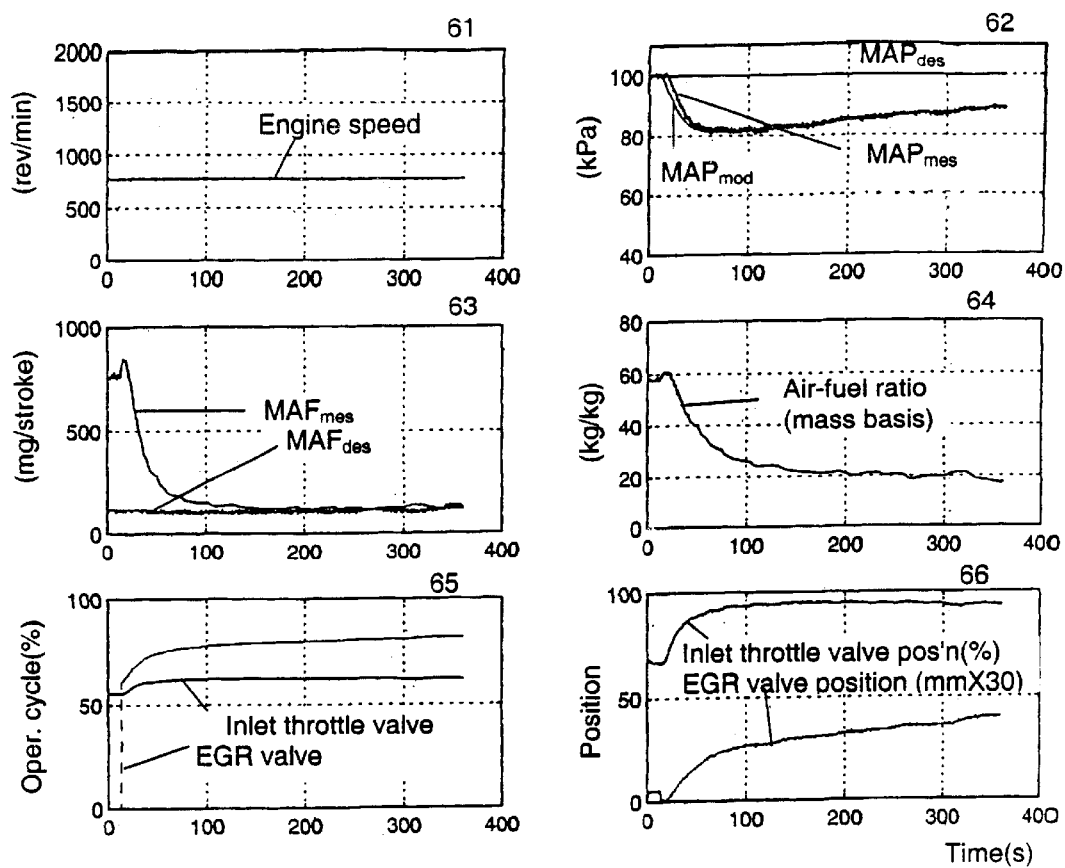
FIG. 4 shows graphs of data collected from an engine operating according to an aspect of the present invention.

FIG. 4 shows the results of carrying out the control algorithm according to an aspect of the present invention. The data shown are the result of experiments on a 3.0 liter engine. The diagrams in FIG. 4 show various parameters of the closed-loop control process plotted against time during the experiment. The engine was operated at idle, in the speed control mode. The idle speed regulator was able to regulate the reference value of 775 rpm as shown in graph 61. The desired intake manifold absolute pressure was fixed at 100 kPa.

Mass air flow rate regulator 20 and coordination module 23 are activated at time t=14 seconds to simulate interruption of DPF 10 regeneration. The desired air/fuel ratio was set to the value 20:1 (on a mass basis). In graph 64 of FIG. 4, air-fuel ratio is approximately 60:1 at the start of the simulation and drops to 20:1 by about 150 seconds.

From graph 65 of FIG. 4, the duty cycle of the EGR valve 3 immediately rises to about 75%. From graph 62, $MAP_{mod}$ immediately drops from its original value of 100 kPa. This is due to the first term (from block 31 in FIG. 3) of coordination module 23 being influenced by the large negative mass air flow rate error. At this point, the influence of the second term (from block 30 in FIG. 3) of coordination module 23 is small, and intake throttle valve 2 remains closed as long as the mass air flow rate error is large.

At t=100 seconds, the air mass flow error has reduced sufficiently (as can be seen in graph 63 of FIG. 4 as a small difference between $MAF_{des}$ and $MAF_{mes}$). The second term of coordination module 23 has produced a step-by-step increase in the desired induction pressure value, thus causing opening of EGR valve 3 and intake valve 2, as shown in graph 66. The implemented coordinated control action, according to the present invention, efficiently maintains the set limit value of the air/fuel ratio during the test that was carried out.

While several modes for carrying out the invention have been described in detail, those familiar with the art to which this invention relates will recognize alternative designs and embodiments for practicing the invention. The above-described embodiments are intended to be illustrative of the invention, which may be modified within the scope of the following claims.

We claim:

1. A method for interrupting regeneration of a particulate filter in an exhaust gas system of an internal combustion engine with an mass air flow rate (MAF) to the engine and an intake manifold absolute pressure (MAP) being detected by sensors and being varied by operating an intake throttle valve disposed in an inlet of the engine and an exhaust gas recirculation valve disposed in an exhaust gas recirculation system coupled to an exhaust of the engine and an intake of the engine, comprising the steps of actuating the exhaust gas recirculation valve to maintain a predetermined air mass flow rate ($MAF_{des}$); and actuating the intake throttle valve to maintain a predetermined intake manifold absolute pressure ($MAP_{mod}$) wherein said predetermined intake manifold absolute pressure ($MAP_{mod}$) is based on a pressure correction ($\Delta$) and a desired intake manifold absolute pressure ($MAP_{des}$), said pressure correction ($\Delta$) depends on a difference between said predetermined mass air flow rate ($MAF_{des}$) and a measured mass air flow rate ($MAF_{mes}$), said measured mass air flow rate ($MAF_{mes}$) is based on an output of the mass air flow sensor.

2. The method of claim 1, further comprising the steps of determining a temperature in the particulate filter; and interrupting regeneration of the particulate filter when said particulate filter temperature exceeds a predetermined temperature.

3. The method of claim 1 wherein said predetermined mass air flow rate ($MAF_{des}$) is calculated as a function of an engine speed (n), a fuel supply ($F_q$) to the engine, and a desired air/fuel ratio ($AF_{des}$).

4. The method of claim 1 wherein said actuation of the exhaust gas recirculation valve is based on a difference between said predetermined mass air flow rate ($MAF_{des}$) and said measured mass air flow rate ($MAF_{mes}$).

5. The method of claim 4 wherein said actuation of the exhaust gas recirculation valve is controlled closed-loop with integral control.

6. The method of claim 1, said actuation of the intake throttle valve is based on a difference between said predetermined intake manifold absolute pressure ($MAP_{mod}$) and a measured intake manifold absolute pressure ($MAP_{mes}$), said measured intake manifold absolute pressure ($MAP_{mes}$) is based on an output of the intake manifold absolute pressure sensor.

7. The method of claim 6, said actuation of the intake throttle valve is controlled closed-loop with integral control.

8. The method of claim 1, said pressure correction ($\Delta$) is based on a time integral of a monotonically rising, preferably nonlinear, function of a difference between said predetermined mass air flow rate ($MAF_{des}$) and said measured mass air flow rate ($MAF_{mes}$).

9. The method of claim 8 wherein said monotonically rising function is multiplied by a factor proportional to the extent of opening of the exhaust gas recirculation valve prior to performing said time integral.

10. The method of claim 1, said pressure correction ($\Delta$) is based on a time integral of a monotonically decreasing function, said function decreases to zero, and on a factor proportional to the extent of opening of the exhaust gas recirculation valve.

11. An apparatus for interrupting regeneration of a particulate filter in an exhaust gas system of a diesel engine, the engine having an mass air flow sensor, an intake manifold absolute pressure sensor, and an intake throttle valve disposed in the intake of the engine, the engine having an exhaust gas recirculation valve in an exhaust gas recirculation system coupled between an engine exhaust and the engine intake, comprising:

a mass air flow rate controller coupled to the exhaust gas recirculation valve which actuates the exhaust gas recirculation valve to maintain a predetermined mass air flow rate ($MAF_{des}$) to the engine;

an intake manifold absolute pressure controller coupled to the intake throttle valve which actuates the intake throttle valve to maintain a predetermined intake manifold absolute pressure ($MAP_{mod}$); and a coordination module which calculates said predetermined intake manifold absolute pressure ($MAP_{mod}$) based on the sum of a pressure correction ($\Delta$) and a desired intake manifold absolute pressure ($MAP_{des}$), said pressure correction depends on a difference between said predetermined mass air flow rate ($MAF_{des}$) and a measured mass air flow rate ($MAF_{mes}$), said measured mass air flow rate is based on an output of the mass air flow sensor.

12. The apparatus of claim 11 wherein said mass air flow rate controller determines a desired exhaust gas recirculation valve position based on a difference between said predetermined mass air flow rate ($MAF_{des}$) and said measured mass air flow rate ($MAF_{mes}$).

13. The apparatus of claim 11 wherein said intake manifold absolute pressure control controller determines a desired intake throttle valve position based on a difference between said predetermined intake manifold absolute pressure ($MAP_{mod}$) and said measured intake manifold pressure ($MAP_{mes}$), said measured intake manifold pressure ($MAP_{mes}$) is based on an output of the intake manifold absolute pressure sensor.

14. The apparatus of claim 11 wherein said pressure correction ($\Delta$) is based on a time integral of a monotonically rising function of a difference between said predetermined mass air flow rate ($MAP_{des}$) and said measured mass air flow rate ($MAF_{mes}$) and on a time integral of a monotonically decreasing function and on a factor proportional to the extent of opening of the exhaust gas recirculation valve.

15. The apparatus of claim 11 further comprising a temperature estimating module for estimating the temperature in the particulate filter wherein regeneration of the particulate filter is interrupted when said estimated temperature in the particulate filter exceeds a predetermined temperature threshold.

16. The apparatus of claim 11 wherein said predetermined mass air flow rate ($MAF_{des}$) is calculated as a function of an engine speed (n), a fuel supply ($F_q$) to the engine, and a desired air/fuel ratio ($AF_{des}$).

17. The apparatus of claim 11 wherein said predetermined mass air flow rate ($MAF_{des}$) is calculated as a function of an amount of flow through said exhaust gas recirculation valve.

18. A computer readable storage medium having stored data representing instructions executable by a computer to actuate an intake throttle valve and an exhaust gas recirculation valve of an internal combustion engine to interrupt regeneration of a particulate filter disposed in an exhaust coupled to the engine, the intake throttle valve, an intake manifold absolute pressure sensor, and a mass air flow sensor are disposed in an intake coupled to the engine, the exhaust gas recirculation valve is disposed in an exhaust gas recirculation system coupled between the engine intake and the engine exhaust, comprising:

instructions to actuate the intake throttle valve to create a predetermined intake manifold absolute pressure ($MAP_{mod}$) in the engine intake;

instructions to actuate the exhaust gas recirculation valve to create a desired mass air flow ($MAF_{des}$); and instructions to coordinate the actuation of the intake throttle valve and the exhaust gas recirculation valve by basing said predetermined intake manifold absolute pressure ($MAP_{mod}$) on the sum of a pressure correction ($\Delta$) and a desired intake manifold absolute pressure ($MAP_{des}$), said pressure correction ($\Delta$) depends on a difference between said predetermined mass air flow rate ($MAF_{des}$) and a measured mass air flow rate ($MAF_{mes}$) said measured mass air flow rate ($MAF_{mes}$) is based on an output of the mass air flow sensor.

19. The computer readable storage medium of claim 18, further comprising instructions to determine said predetermined intake manifold absolute pressure ($MAP_{mod}$) based on a difference between said predetermined mass air flow rate ($MAF_{des}$) and said measured mass air flow rate ($MAF_{mes}$).

20. The computer readable storage medium of claim 18, further comprising instructions to determine a desired exhaust gas recirculation valve position based on a difference between said predetermined mass air flow rate ($MAF_{des}$) and said measured mass air flow rate ($MAF_{mes}$).

21. The computer readable storage medium of claim 18, further comprising instructions to determine said predetermined mass air flow rate ($MAF_{des}$) as a function of an engine speed (n), a fuel supply ($F_q$) to the engine, and a desired air/fuel ratio ($AF_{des}$).

22. The computer readable storage medium of claim 18 wherein a sensor to detect position is coupled to the exhaust gas recirculation, further comprising instructions to determine said pressure correction based on an output of said position sensor, said predetermined mass air flow rate ($MAF_{des}$), and said measured mass air flow rate ($MAF_{mes}$).

* * * * *